(12) United States Patent
Aizenberg et al.

(10) Patent No.: US 7,106,519 B2
(45) Date of Patent: Sep. 12, 2006

(54) TUNABLE MICRO-LENS ARRAYS

(75) Inventors: Joanna Aizenberg, New Providence, NJ (US); Mischa Megens, Eindhoven (NL); Shu Yang, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 343 days.

(21) Appl. No.: 10/631,996

(22) Filed: Jul. 31, 2003

(65) Prior Publication Data

US 2005/0024730 A1    Feb. 3, 2005

(51) Int. Cl.
  *G02B 27/10*    (2006.01)
(52) U.S. Cl. .............. 359/620; 359/626; 359/665; 359/666
(58) Field of Classification Search ............. 359/620, 359/626, 665, 666
  See application file for complete search history.

(56) References Cited

U.S. PATENT DOCUMENTS

| | | | |
|---|---|---|---|
| 3,454,686 A | 7/1969 | Jones ..................... 264/1 |
| 3,670,130 A | 6/1972 | Greenwood ............. 200/183 |
| 4,030,813 A | 6/1977 | Kohashi et al. ......... 350/161 S |
| 4,118,270 A | 10/1978 | Pan et al. ............... 156/659 |
| 4,137,060 A | 1/1979 | Timmermann ............ 65/31 |
| 4,338,352 A | 7/1982 | Bear et al. ............... 427/8 |
| 4,406,732 A | 9/1983 | Kayoun .................. 156/626 |
| 4,569,575 A | 2/1986 | Le Pesant et al. ........ 350/353 |
| 4,653,847 A | 3/1987 | Berg et al. ............... 350/96.2 |
| 4,671,609 A | 6/1987 | Khoe et al. .............. 350/96.18 |
| 4,708,426 A | 11/1987 | Khoe ....................... 350/96.18 |
| 4,867,521 A | 9/1989 | Mallinson ................ 350/96.18 |
| 4,948,214 A | 8/1990 | Hamblen .................. 350/413 |
| 5,248,734 A | 9/1993 | Ober et al. ............... 525/328.8 |
| 5,348,687 A | 9/1994 | Beck et al. ............... 252/582 |
| 5,412,746 A | 5/1995 | Rossberg et al. ......... 385/48 |
| 5,428,711 A | 6/1995 | Akiyama et al. ......... 395/25 |
| 5,486,337 A | 1/1996 | Ohkawa .................. 422/100 |
| 5,518,863 A | 5/1996 | Pawluczyk ............... 430/321 |
| 5,659,330 A | 8/1997 | Sheridon ................. 345/84 |
| 5,665,527 A | 9/1997 | Allen et al. .............. 430/325 |
| 5,922,299 A | 7/1999 | Bruinsma et al. ........ 423/335 |
| 5,948,470 A | 9/1999 | Harrison et al. ......... 427/198 |
| 5,986,811 A * | 11/1999 | Wohlstadter ............. 359/626 |
| 6,014,259 A | 1/2000 | Wohlstadter ............. 359/619 |
| 6,027,666 A | 2/2000 | Ozin et al. ............... 252/301.4 R |
| 6,295,167 B1 * | 9/2001 | Uematsu et al. .......... 359/665 |
| 6,319,427 B1 | 11/2001 | Ozin et al. ............... 252/301.4 F |
| 6,329,070 B1 | 12/2001 | Sass et al. ............... 428/612 |
| 6,369,954 B1 | 4/2002 | Berge et al. ............. 359/666 |

(Continued)

FOREIGN PATENT DOCUMENTS

DE    196 23 270 A    1/1998

(Continued)

OTHER PUBLICATIONS

Tuberfield, A.J., "Photonic Crystals Made By Holographic Lithography," MRS. Bulletin, Aug. 2001, pp. 632-636.

(Continued)

*Primary Examiner*—Hung Xuan Dang
*Assistant Examiner*—Joseph Martinez

(57) ABSTRACT

An apparatus includes a planar substrate and an array of substantially transparent spherical micro-lenses forming a pattern. The pattern has an internal two-dimensional lattice symmetry on the planar substrate. Each micro-lens includes a convex bulge or a concave depression in a surface of the planar substrate. The micro-lenses and substrate include hydrogel that swells and contracts in a manner that is responsive to an environmental condition.

5 Claims, 15 Drawing Sheets

U.S. PATENT DOCUMENTS

| | | | |
|---|---|---|---|
| 6,379,874 B1 | 4/2002 | Ober et al. | 430/322 |
| 6,387,453 B1 | 5/2002 | Brinker et al. | 427/387 |
| 6,409,907 B1 | 6/2002 | Braun et al. | 205/317 |
| 6,465,387 B1 | 10/2002 | Pinnavaia et al. | 502/158 |
| 6,471,761 B1 | 10/2002 | Fan et al. | 106/287.16 |
| 6,538,823 B1 | 3/2003 | Kroupenkine et al. | 359/665 |
| 6,545,815 B1 | 4/2003 | Kroupenkine et al. | 359/665 |
| 6,545,816 B1 | 4/2003 | Kroupenkine et al. | 359/665 |
| 6,654,174 B1 * | 11/2003 | Huang | 359/619 |

FOREIGN PATENT DOCUMENTS

| | | |
|---|---|---|
| FR | 2 769 375 A1 | 4/1999 |
| FR | WO 99/18456 | 4/1999 |
| WO | WO 01/31404 A1 | 5/2001 |
| WO | WO 01/42540 A1 | 6/2001 |
| WO | WO 01/51990 A1 | 7/2001 |

OTHER PUBLICATIONS

Campbell, M., et al., "Fabrication of Photonic Crystals For The Visible Spectrum by Holographic Lithography," Nature, vol. 404, Mar. 2, 2000, pp. 53-56.

Ho, K.M., et al., "Existence Of A Photonic Gap in Periodic Dielectric Structures," Physical Review Letters, vol. 65, No. 25, Dec. 17, 1990, pp. 3152-3155.

Ozbay, E., et al., "Measurement Of A Three-Dimensional Photonic Band Gap In A Crystal Structure Made Of Dielectric Rods," Physical Review B, vol. 50, No. 3, Jul. 15, 1994, pp. 1945-1948.

Tuberfield, A., "Photonic Crystals Made By Holographic Lithography," ABSTRACT from Symposium K, Microphotonics-Materials, Physics, and Applications, Nov. 26-29, 2001, 1 page.

Shoji, S., et al., "Photofabrication Of Three-Dimensional Photonic Crystals By Multibeam Laser Interference Into A Photopolymerizable Resin," Applied Physics Letters, vol. 76, No. 19, May 8, 2000, pp. 2668-2670.

Sundararajan, N., et al "Supercritical $CO_2$ Processing for Submicron Imaging of Fluoropolymers," Chemistry of Materials, vol. 12, No. 1, Jan. 2000, pp. 41-48.

Kresge, C.T., et al: "Ordered mesoporous molecular sieves synthesized by a liquid-crystal template mechanism" NATURE, vol. 359, Oct. 1992, pp. 710-712.

Tanev, Peter T., et al: "A Neutral Templating Route to Mesaporous Molecular Sieves, " SCIENCE, vol. 267, Feb. 1995, pp. 865-867.

Huo, Q. et al: "Generalized synthesis of periodic surfactant/inorganic composite materials," NATURE, vol. 368, Mar. 1994, pp. 317-321.

Sanchez, C., et al: "Design and Properties of Hybrid Organic-Inorganic Nanocomposites for Photonics," MRS Bulletin, May, 2001, pp. 377-387

Yang, P., et al: "Hierarchically Ordered Oxides," Science, vol. 282, Dec. 1998, pp. 2244-2246.

Templin, M. et al: "Organically Modified Aluminosilicate Mesostructures from Block Copolymer Phase," Science, vol. 278, Dec. 1997, pp. 1795-1798.

Raman, N.K., et al: "Template-Based Approaches to the Preparation of Amorphous, Nanoporous Silicas," Chemical Matter, vol. 8, Feb. 1996, pp. 1682-1701.

Yang, P., et al: "Block Copolymer Templating Syntheses of Mesoporous Metal Oxides with Large Ordering Lengths and Semicrystalline Framework," Chemical Matter, vol. 11, 1999, pp. 2813-2826.

Brinker, C.J., et al., "Evaporation-induced Self-Assembly: Nanostructures made Eassy**" Advanced Materials, vol. 11, 1999, pp. 579-585.

Lee, Y-J., Braun, P.V., "Tunable Inverse Opal Hydrogel pH Sensors," Adv. Mater. 2003, 15, No. 7-8. Apr. 17, 2003, pp. 563-566.

Arsenault, A.C., et al., "A Polychromic, Fast Response Metallopolymer Gel Photonic Crystal with Solvent and Redox Tunability: A Step Towards Photonic Ink (P-Ink)," Adv. Mater. 2003, 15, No. 6, Mar. 17, 2003, pp. 503-507.

Zhang, S., et al., "Materials and techniques for electrochemical biosensor design and construction," Biosensors & Bioelectronics 15, (2000), pp. 273-282.

Wu, H., et al., "Reduction Photolithography Using Microlens Arrays: Applications in Gray Scale Photolithography," Analytical Chemistry, vol. 74, No. 14, Jul. 15, 2002, pp. 3267-3273.

Leister Microsystems, leaflet by Leister Microsystems entitled, "Micro-optics—Imagine the Future of Light," Sep. 2000, 4 pages.

Stokes, D.L., et al., "Detection of E. coli using a microfluidics-based Antibody Biochip detection systems," Fresenius, J. Anal Chem (2001) 369, pp. 295-301.

Jahns, J., et al., "Microoptics for biomedical applications," American Biotechnology Laboratory, No. 18, Oct. 2000, pp. 52 and 54.

Campbell, D.J., et al., "Replication and Compression of Bulk and Surface Structures with Pholydimethylsiloxane Elastomer," Journal of Chemical Education, vol. 75, No. 4, Apr. 1999, pp. 537-541.

Kruk, M., et al., "Mesoporous Silicate-Surfactant Composites with Hydrophobic Surfaces and Tailored Pore Sizes"; Journal of Physical Chemistry 106 B (2002) pp. 10096-10101.

Thrush, E., et al., "Integrated semiconductor fluorescent detection systems for biochip and biomedical applications," IEEE-EMBS Special Topic Conference on Microtechnologies in Medicine & Biology, May 2002, pp. 374-379.

Avgeropoulos, et al., "Synthesis and Morphological Behavior of Silicon-Containing Triblock Copolymers of Nanostructure Applications," Chem. Mater. 1998, 10, pp. 2109-2115.

Chan, Vanessa A-H., et al., "Ordered Bicontinuous Nanoporous and Nanorelief Ceramic Films from Self-Assembling Polymer Precursors," Science, Nov. 26, 1999, vol. 286, pp. 1716-1719.

Shishido, A., et al., "Direct fabrication of two-dimensional titania arrays using interference photolithography," Applied Physical Letters, vol. 79, No. 20, Nov. 12, 2001, pp. 3332-3334.

Young, "Organic-Inorganic Monomers," accessed at http://www.psrc.unm.edu/mauritz/nano2.html, Jul. 8, 2002.

Yang, et al., "Creating Periodic Three-Dimensional Structures by Multibeam Interference of Visible Laser," Chemistry of Materials, vol. 14, No. 7, Jul. 2002, pp. 2831-2833.

Vlasov et al., "On-Chip Natural Assembly of Silicon Photonic Bandgap Crystals," Nature, vol. 414, Nov. 15, 2001, pp. 289-293.

Baney, et al., "Silsesquioxanes," American Chemical Society, 1995, pp. 1409-1430.

The Wittman Company, "Carbon Dioxide," published online at http://www.witteman.com/co2.htm, Dec. 4, 2002, 2 pages.

"Sol-Gel Chemistry," published online at http://www.sol-gel.com/chemi.htm, Dec. 9, 2002, 2 pages.

Joanna Aizenberg et al, "Calcite microlenses as part of the photoreceptor system in brittlestars". Nature vol. 412 (Aug. 23, 2001) pp. 819-822.

Washizu, Masao, "Electrostatic Actuation of Liquid Droplets for Microreactor Applications," IEEE Transactions on Industry Applications, vol. 34, No. 4, Jul. Aug. 1998, pp. 732-737.

Schilling, Andreas et al., Surface Profiles of Reflow Microlenses Under the Influence of Surface Tension and Gravity, Opt. Eng. 39(8) pp. 2171-2176, Society of Photo-Optical Instrumentation Engineers, Aug. 2000.

Danzerbrink, R. et al., "Deposition of Micropatterned Coating Using an Ink-Jet Technique," Thin Solid Films 351, pp. 115-118, Elsevier Science S.A. (1999).

Feng, Chuan Liang et al., "Reversible Wettability of Photoresponsive Flourine-Containing Azobenzene Polymer in Langmuir-Blodgett Films," Langmuir vol. 17, No. 15, 2001, pp. 4593-4597, American Chemical Society, published on Web Jun. 22, 2001.

Ichimura, Kunihiro et al., "Light-Driven Motion of Liquids on a Photoresponsive Surface," Science, vol. 288, Jun. 2, 2000, pp. 1624-1626.

Commander, L.G. et al., "Variable Focal Length Microlenses," Optics Communictions 177, Apr. 15, 2000, pp. 157-170.

Aizenberg, J., et al., "Calcitic microlenses as part of the photoreceptor system in brittlestars," *Nature*, vol. 412, pp. 819-822, Aug. 23, 2001.

English language translation of abstract for German Patent Document : DE 19623270 from European Patent Office database, (esp@cenet.com (1998), 1 page.

Abbot, N.L., et al., "*Potential-Dependent Wetting of Aqueous Solutions on Self-Assembled Monolayers Formed from 15-(Ferrocenylcarbonyl) pentadecanethiol on Gold,*" Langmuir 1994, American Chemical Society, vol. 10, pp. 1493-1497.

Strokes, D.L., et al., "Detection of E. *coli* using a microfluidics-based antibody biochip detection system," Journal of Analytic Chemistry, vol. 369, pp. 295-301, (2001).

* cited by examiner

PHEMA    PEG    PVA    PNIPA

PMAA    Na SALT OF PMAA    HYALURONIC ACID

1st EXPOSURE　　　　　2nd EXPOSURE

TUNABLE MICRO-LENS ARRAYS

BACKGROUND

1. Field of the Invention

The invention relates to optical lens arrays and methods for making such arrays.

2. Discussion of the Related Art

Some living organisms have natural arrays of optical lenses. Examples of natural arrays of optical lenses include the compound eyes of many insects and the skeletons of brittle stars. In these natural arrays, the individual optical lenses are capable of forming separate images. Lens arrays that simultaneously form multiple images have many potential applications. These applications have stimulated an interest in making such arrays artificially. For some applications, it is desirable to have arrays whose individual optical lenses have tunable optical parameters.

Examples of optical lenses with tunable focal lengths include variable compound lenses and electro-wetting controlled droplet lenses. A variable compound lens includes two spherical lenses and a mechanical device for varying the distance between the two spherical lenses. Varying the distance between the two spherical lenses varies the overall focal length of the compound lens. An electro-wetting controlled droplet lens includes a liquid droplet, a non-wettable substrate to support the droplet, and a voltage source to apply a voltage across the droplet. The voltage produces electro-wetting forces between the droplet and substrate. The electro-wetting forces redistribute the liquid of the droplet thereby changing the droplet's surface curvature and the focal length of the droplet lens.

Artificial arrays could provide for tunable focal lengths by incorporating tunable compound lenses or electro-wetting controlled droplet lenses. Nevertheless, compact arrays of such lenses are often inconvenient or complex because of the need for devices to enable tuning of each lens therein. Simple tunable artificial lens arrays are desirable.

BRIEF SUMMARY

The various embodiments relate to tunable micro-lens arrays and methods for fabricating such arrays. The arrays are fabricated of materials that include a hydrogel that swells and contracts in response to changes in selected environmental conditions, e.g., pH, ion concentration, temperature, or electric field intensity. The swelling and contraction of the hydrogel causes optical properties of the micro-lens arrays to change, i.e., focal lengths and/or lens spacings.

In one aspect, the embodiments feature an apparatus that includes a planar substrate and an array of substantially transparent spherical micro-lenses that forms a pattern with an internal two-dimensional lattice symmetry on the planar substrate. Each micro-lens includes a convex bulge or a concave depression in a surface of the planar substrate. The micro-lenses and substrate include hydrogel that swells and contracts in a manner that is responsive to an environmental condition.

In another aspect, the embodiments feature a method for fabricating a micro-lens array. The method includes exposing a layer of homogeneous starting medium to one or more interference patterns of multiple light beams, curing the exposed layer, then washing the cured layer to produce a cross-linked master pattern, and forming from the master pattern a replica stamp. The exposing step produces a concentration pattern of reaction products in the layer of homogeneous starting material. The concentration pattern tracks the time-integrated light intensity produced by the one or more interference patterns in the layer. The master pattern has a surface-relief that tracks the concentration pattern of reaction products. The replica stamp has a surface-relief that is a negative copy of the surface-relief of the master pattern. The surface-relief of the replica stamp includes a regular two-dimensional array of lens-shaped structures.

In another aspect, the embodiments feature another method for fabricating a micro-lens array. The method includes exposing a layer of homogeneous hydrogel starting medium to one or more interference patterns of multiple light beams. The exposing step stimulates a reaction that produces a concentration pattern of reaction products in the layer. The concentration pattern tracks the time-integrated light intensity produced by the one or more interference patterns in the layer. The method also includes curing the film to produce a cross-linking pattern that tracks the concentration pattern of reaction products and then, washing the cured film to remove uncross-linked oligomers and produce a layer of hydrogel having an array of spherical micro-lenses.

BRIEF DESCRIPTION OF THE DRAWINGS

In the Figures and text, like reference numbers indicate features with similar functions.

DETAILED DESCRIPTION OF ILLUSTRATIVE EMBODIMENTS

Figure 1:
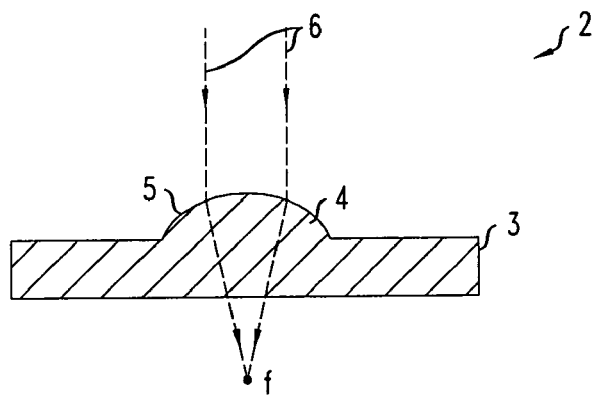
FIG. 1 is a cross-sectional view of a tunable micro-lens.

FIG. 1 shows a tunable optical lens 2 that includes a transparent planar substrate 3 and a transparent spherical bulge 4 that is integral with the substrate. The spherical bulge 4 includes a spherical top surface 5. Exemplary spherical top surfaces 5 may have convex or concave shapes. The illustrated convex spherical top surface 5 refracts parallel incident light rays 6 towards a focal point, f, located behind the substrate 3. Both spherical bulge 4 and substrate 3 are made of a hydrated hydrogel.

Herein, a hydrogel is a three-dimensional network that is formed of a hydrophilic homopolymer or a hydrophilic copolymer. In a hydrogel, the polymer network is water insoluble due to cross-linking produced by bonds, i.e., covalent, ionic, or hydrogen bonds, and/or by physical polymer entanglement. In a hydrogel, the polymers are hydrophilic due to polar functional groups such as hydroxyl, carboxylic acid, amide, and/or ether groups. Due to these groups a hydrogel can absorb a substantial amount of water or another polar solvent to become a hydrated hydrogel. Typical hydrogels can absorb more than 20 percent of their weight in water. Hydrated hydrogels have the ability to swell and contract in manners responsive to changes in physical environmental conditions such as: pH, ionic strength, solvent composition, temperature, electric field, and/or light intensity. This swelling and contracting enables a hydrated hydrogel to undergo significant volume change, e.g., at least 10% or more and sometimes as much as one to several times the initial volume, without disruption of the underlying polymer network. Often, small changes to selected environmental conditions cause a hydrogel to rapidly swell or contract.

Figure 2:
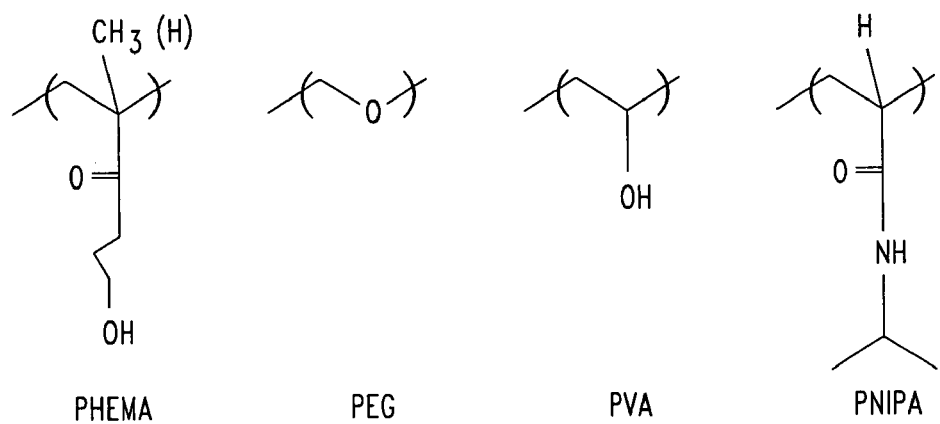
FIG. 2 shows monomers of exemplary hydrogel polymers.
Figure 2:
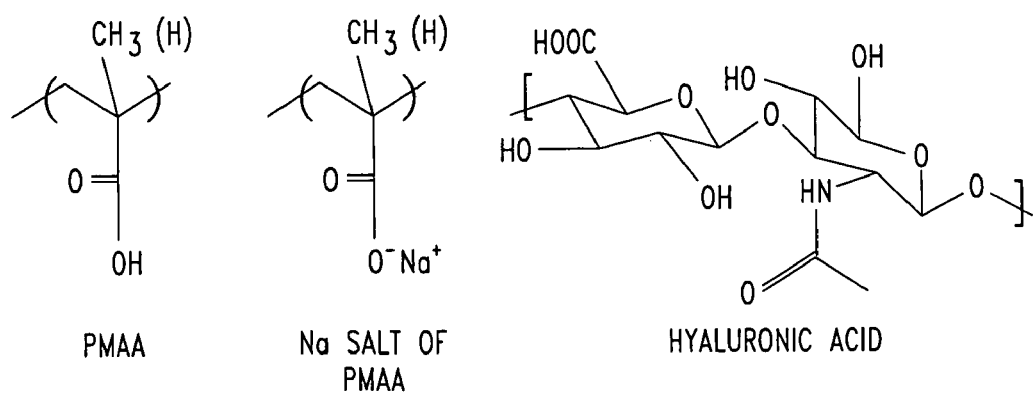

FIG. 2 illustrates linear polymers of several exemplary hydrogels. The polymers include poly(2-hydroxyethyl methacrylate) (PHEMA), poly(ethylene glycol) (PEG), poly(vinyl alcohol) (PVA), poly(N-isopropylacrylamide) (PNIPA), poly(methacrylic acid) (PMAA), hyaluronic acid, and a salt of PMAA. Hydrated hydrogels, which have pendent hydrophilic groups, are pH sensitive. For example, PHEMA and PMAA contract in response to acidic pHs and swell in response to basic pHs. Hydrogels with hydrophobic pendent groups, e.g., methyl, ethyl and propyl groups, are temperature sensitive. For example, PNIPA has lower critical solution temperature (LCST) around 32° C. PNIPA's water solubility decreases and PNIPA's size contracts when the temperature increases above 32° C.

Since a hydrated hydrogel swells and contracts in response to environmental conditions, the hydrated hydrogel optical lens 2 of FIG. 1 will swell and contract in a manner that is responsive to the same environmental conditions. Such swelling and contracting changes the radius of spherical top surface 5 and thus, changes the focal length, f, of the optical lens 2. Thus, in the hydrated hydrogel optical lens 2, focal length tuning involves varying the hydrogel's density by changing environmental conditions. In contrast, in droplet lenses, focal length tuning typically involves applying forces that change the liquid droplet's shape, but not the droplet's density.

Figure 3:
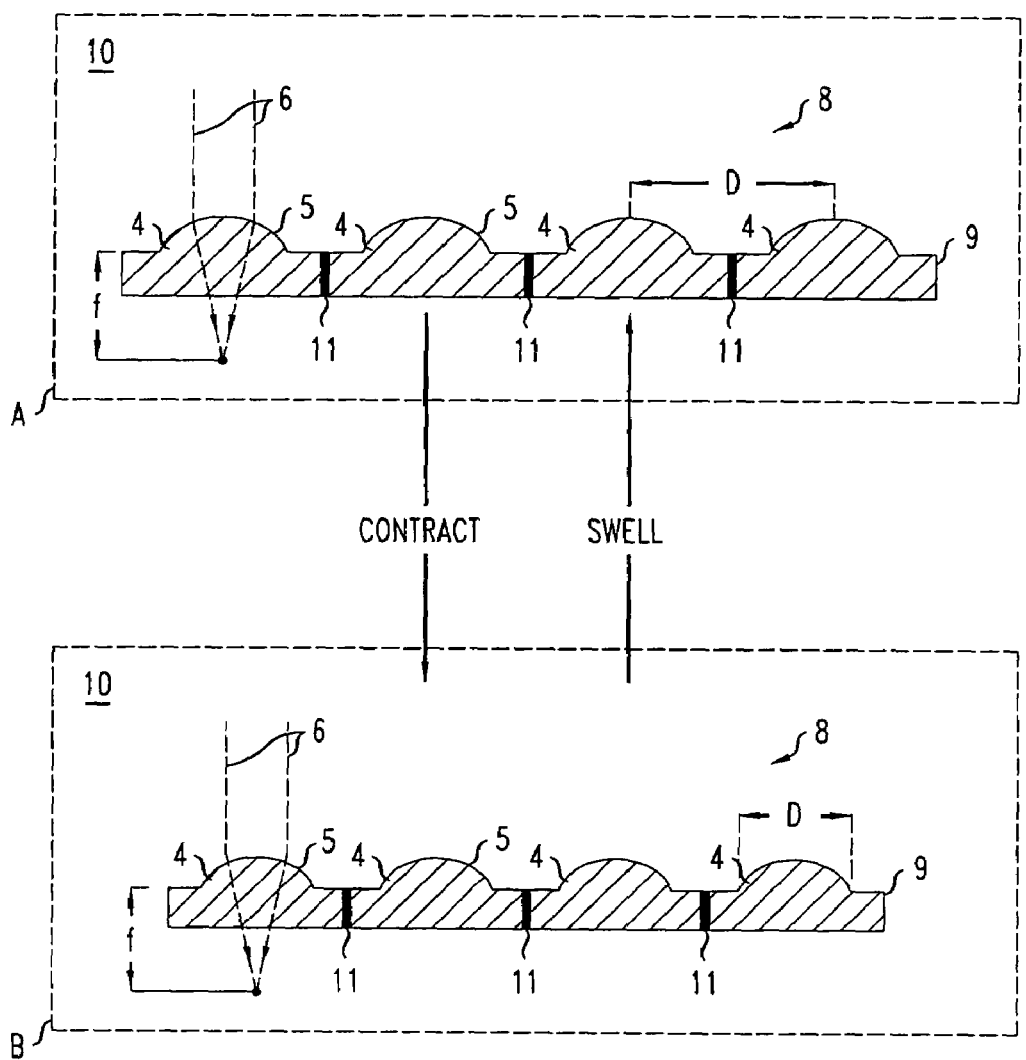
FIG. 3 provides cross-sectional views of a hydrogel micro-lens array in a swollen state and a contracted state.

FIG. 3 shows a micro-lens array 8 fabricated of a transparent hydrogel, e.g., a hydrogel from a polymer of FIG. 2. The micro-lens array 8 includes a transparent planar substrate 9 and transparent spherical bulges 4, i.e., convex or concave spherical optical lenses. The spherical bulges 4 are integral with the substrate 9 and form a periodic array that has an internal two-dimensional (2D) cubic or hexagonal lattice symmetry. Both the planar substrate 9 and the spherical bulges are formed of a hydrogel that is hydrated by absorption of a polar liquid, e.g., water. The hydrated hydrogel's response to an environmental condition such a pH, ion concentration, temperature, or light intensity causes the micro-lens array 8 to swell or contract. Such swelling and contracting changes both focal lengths, f, and lateral separations, D, between the centers of adjacent spherical lenses 4. Thus, both focal length and lateral separation are tunable through environmental conditions at the micro-lens array 8.

In some embodiments, special features facilitate the swelling and contracting that occurs during optical tuning of the micro-lens array 8. First, the micro-lens array 8 may be freestanding and not rigidly fixed to an underlying substrate so that lateral motions are facilitated. Second, micro-lenses 4 may have small disk-like diameters, d, e.g., d<100 micrometers (µm) and preferably about 5–6 µm or less. Third, the substrate 9 may be thin and be traversed by pores 11. These second and third features facilitate diffusion between interiors of the micro-lenses 4 and substrate 9 and the exterior region 10. Such diffusion lowers ion concentration gradients between the external region 10 and the interiors of the micro-lenses 4 and substrate 9.

Figure 4:
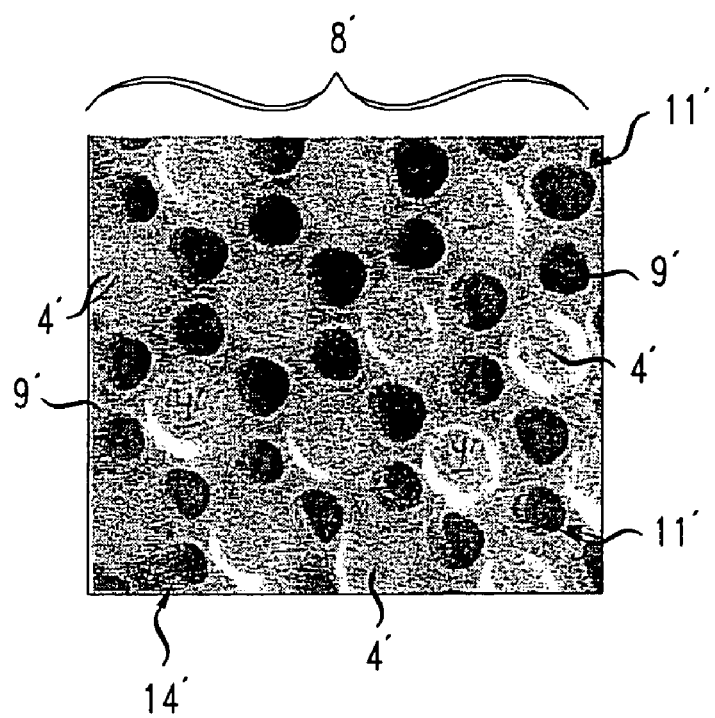
FIG. 4 is a top view of array of lens-shaped objects that was fabricated by multi-beam interference lithography.

FIG. 4 shows an array 8' that was fabricated via three-beam interference lithography. The array 8' includes a substrate 9' and a pattern of spherical bulges 4' integral with a substrate 9'. The substrate 9' is pierced by pattern of pores 11'. The spherical bulges 4' form convex lens-shaped objects that are arranged in a pattern with an internal 2D hexagonal lattice symmetry.

Figure 5:
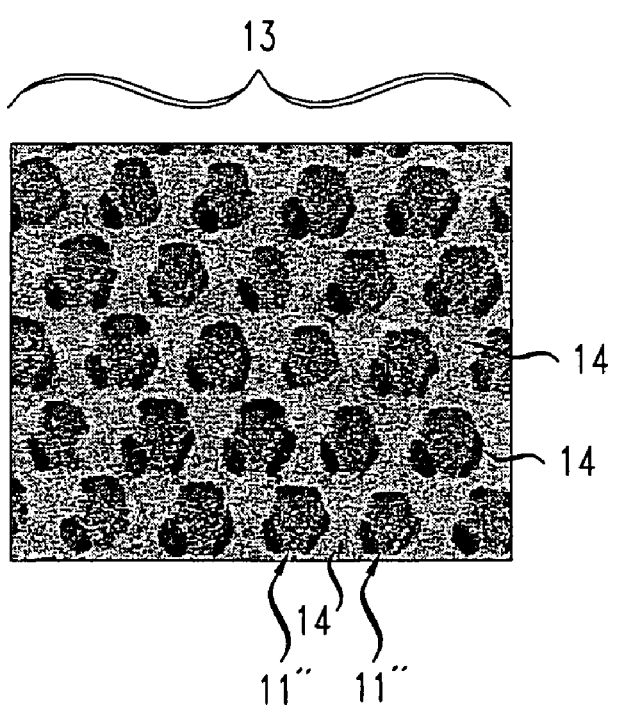
FIG. 5 is a top view of an artificial crystal that has an internal three-dimensional (3D) lattice symmetry and was fabricated by multi-beam interference lithography

In contrast, FIG. 5 shows an array structure 13 that was fabricated by four-beam interference lithography. The array structure 13 has nodes 14 and pores 11', but does not have the convex spherical bulges as in FIG. 4. Instead, four-beam lithography has made an array structure 13 with an internal three-dimensional, lattice symmetry so that the nodes 14 connect to a lower layer of nodes 14 rather than forming lens-shaped objects.

Figure 6:
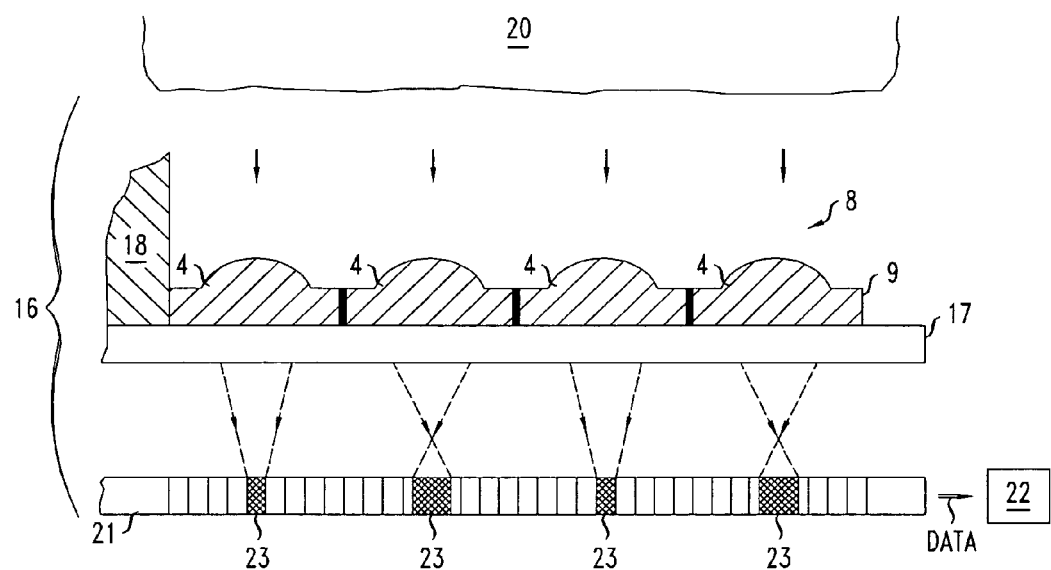
FIG. 6 is a cross-sectional view of an environmental monitoring system that uses the micro-lens array of FIG. 3.
Figure 7:
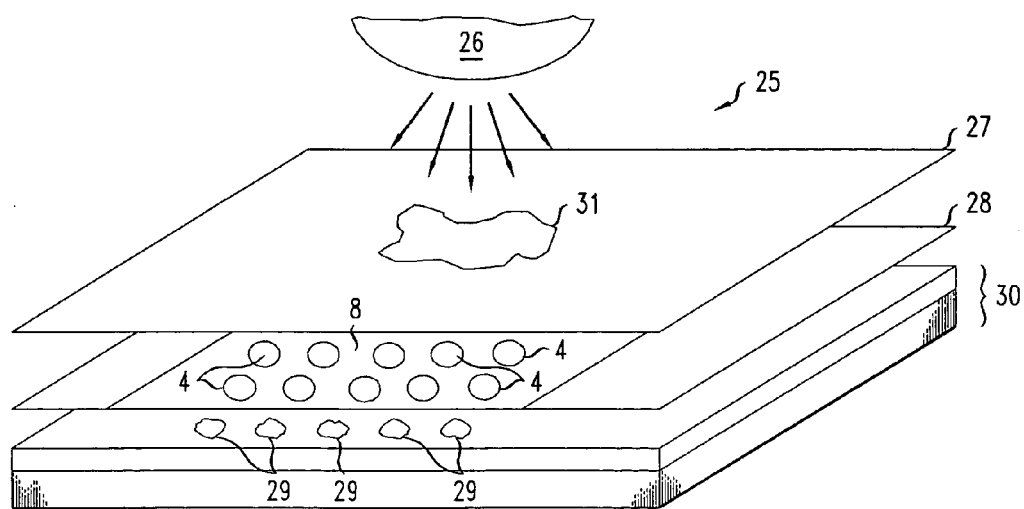
FIG. 7 is an oblique view of a reduction imaging system that uses the micro-lens array of FIG. 3.

Hydrogel micro-lens arrays are useful for environmental monitoring devices and tunable array-type reduction imaging systems as shown in FIG. 6 and FIG. 7, respectively.

FIG. 6 shows an environmental monitoring device 16. In the monitoring device 16, a hydrated hydrogel micro-lens array 8 rests on a transparent glass slide 17 and has one edge fixedly attached to a wall 18. This support configuration enables the micro-lens array 8 to swell and contract along a top surface of the glass slide 17 in a reproducible manner. The monitoring device 16 also includes a collimated light source 20, a spatially segmented light detector 21, and a programmed data processor 22, e.g., a programmed computer. In response to light from the collimated light source 20 illuminating the hydrogel micro-lens array 8, individual micro-lenses 4 form light spots 23 on the segmented light detector 21. The light detector sends intensity and position data to the programmed data processor 22, which uses the data to determine sizes and/or lateral locations of the light spots 23 produced by the micro-lenses 4.

In response to changes in environmental conditions, the hydrogel micro-lens array 8 swells and contracts changing both lateral positions and focal lengths of micro-lenses 4. These physical changes are reproducible, because one edge of the hydrogel micro-lens array 8 is fixed to wall 18. The changes in lateral position and focal length of the hydrogel micro-lenses 4 change both the locations and the sizes of the light spots 23. Thus, the locations and the sizes of the light spots 23 change in a reproducible manner in response to changes to environmental conditions such as pH, ion concentration, or temperature. From the received data on positions and/or sizes of light spots 23, programmed data processor 22 quantitatively determines values of one or more of the environmental conditions, e.g., pH, temperature, or ion concentration, that controls the swelling and contraction of the hydrated hydrogel of the micro-lens array 8. The data processor 22 may be programmed to determine local values of environmental conditions, e.g., in a biological system, by comparing the sizes and/or the locations of different ones of the light spots 23.

FIG. 7 is an oblique view of a tunable array-type reduction imaging system 25. The array-type reduction imaging system 25 includes a 2D hydrated hydrogel micro-lens array 8, a light source 26, a shadow mask 27, and a glass plate 28. The hydrogel micro-lens array 8 rests on the glass plate 28 and is illuminated by light transmitted through the shadow mask 27. From the illumination, the 2D hydrogel micro-lens array 8 forms a regular 2D pattern of reduced-sized images 29 on a layer 30, e.g., a photoresist, from the pattern 31 on the shadow mask 27. The size and spacing of the images 29 are tunable through environmental conditions that cause the hydrated hydrogel of the 2D micro-lens array 8 to swell and contract.

Multi-beam interference lithography methods enable fabrication of hydrogel micro-lens arrays with regular 2D lattice symmetries. Various embodiments of the fabrication methods use a replica stamp as in exemplary methods 40, 40' of FIGS. 8 and 9 or use a photosensitive hydrogel precursor as in exemplary method 40" of FIG. 10. Aspects of multi-beam interference lithography are described in U.S. patent application Ser. No. 10/040,017 ('017 application) filed by Misha Megens et al on Jan. 4, 2002, which is incorporated herein by reference in its entirety.

With respect to stamp method 40 intermediate structures and the final micro-lens array 8' are shown in FIGS. 11A–11E and FIG. 11F, respectively.

Figure 8:
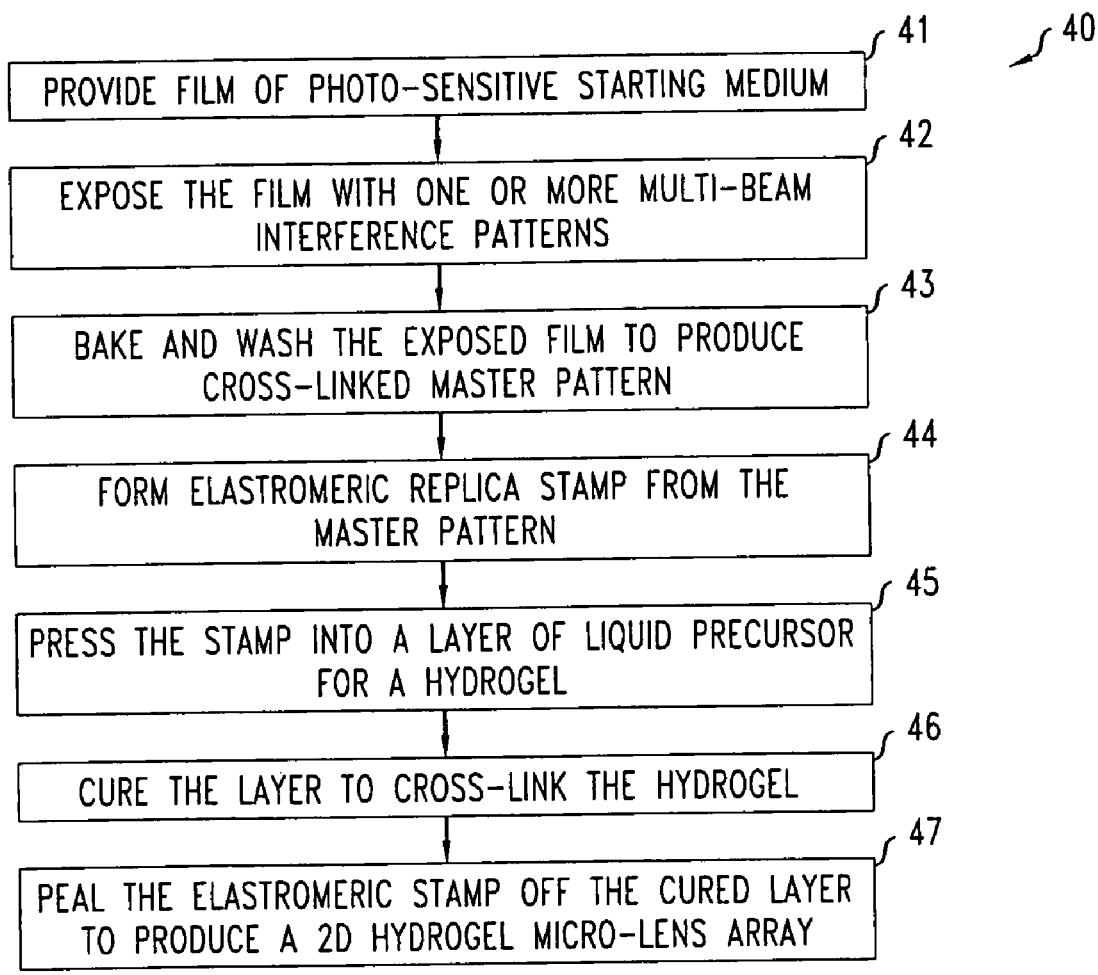
FIG. 8 is a flow chart for a stamp method of fabricating a hydrogel micro-lens array that has an internal 2D lattice symmetry.
Figure 11A:
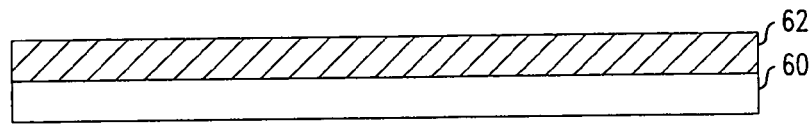
FIGS. 11A–11E show intermediate structures fabricated at various steps in the stamp method of FIG. 8.
Figure 12:
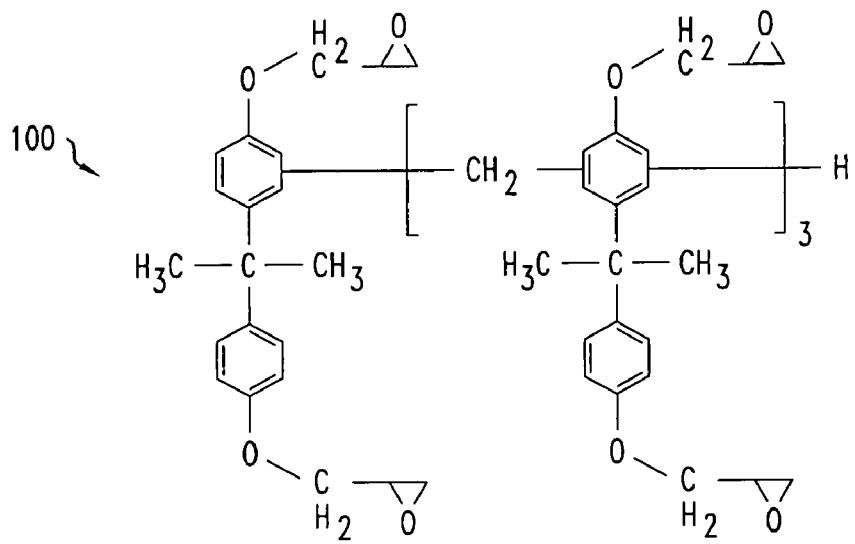
FIG. 12 shows an epoxide oligomer used in an exemplary photosensitive starting media of the method of FIG. 8.
Figure 14:
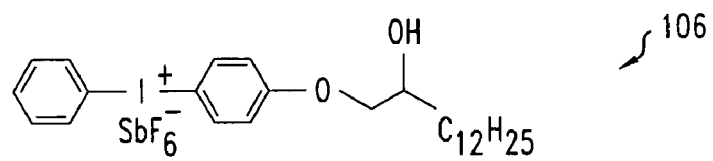
FIGS. 14A–14B show photo acid generator (PAG) molecules used in the exemplary photosensitive starting media of the method of FIG. 8.
Figure 14:
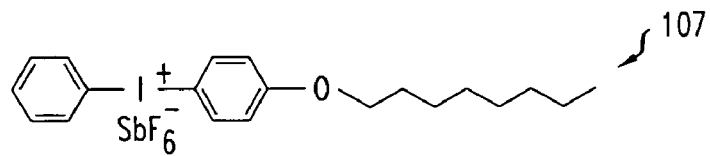
Figure 13:
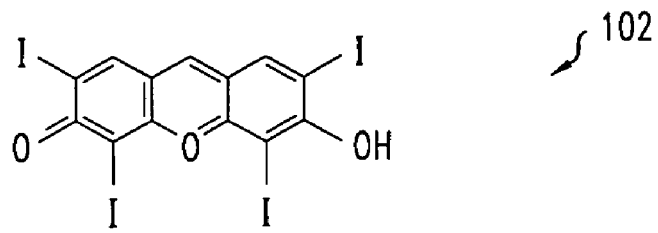
FIGS. 13A–13C show dye molecules used in the exemplary photosensitive starting media of the method of FIG. 8.
Figure 13:
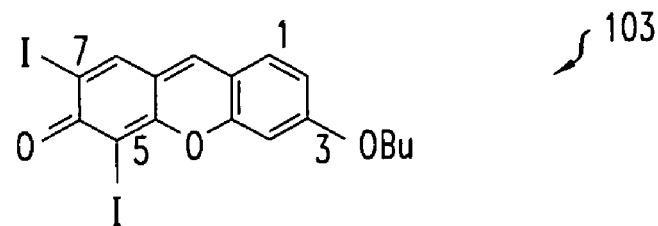
Figure 13:
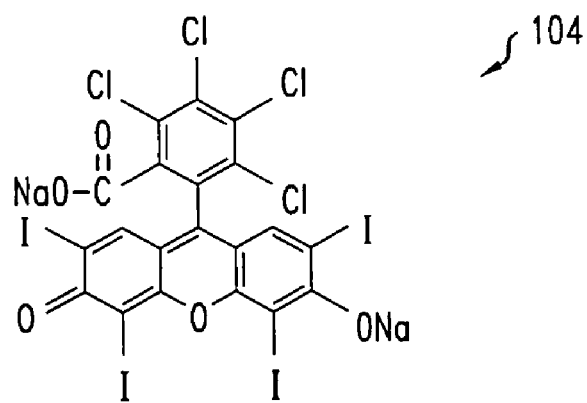

Referring to FIG. 8, stamp method 40 includes providing a substrate 60 that is coated with a film 62 of photosensitive starting medium as shown in FIG. 11A (step 41). The photosensitive starting medium is a homogeneous liquid mixture that includes oligomers, dye molecules, initiator complexes, solvent, and may optionally include cross-linker molecules for the oligomers. Initiator complexes are molecules that stimulate the production of photo-reaction products in response to being excited by excited dye molecules. Examples of suitable photosensitive starting media include photoresists that combine epoxide oligomers, visible dye molecules, PAG-type initiator complexes, and a non-nucleophilic organic solvent. FIG. 12 shows a suitable epoxide oligomer 100, which is available as a resin under product name EPON™ SU-8 from Resolution Performance Products, 1600 Smith Street, 24th Floor, P.O. Box 4500, Houston, Tex. 77210-4500 USA. FIGS. 13A–13C show suitable visible dye molecules 102–104. The dyes 102, 103 are available under respective product names HNu-535 and HNu-470 from Spectra Group Limited, Inc., 1722 Indian Wood Circle, Suite H, Maumee, Ohio 43537 USA. The dye 104, which is known as Rose Bengal, is available from Aldrich Company, P.O. Box 2060, Milwaukee, Wis. 53201 USA. FIGS. 14A–14B show ionic initiator complexes that are photo-acid generators (PAGs) 106, 107. The PAG 106 is available under product name SarCat® SR1012 from Sartomer Inc., Oaklands Corporate Center, 502 Thomas Jones Way Exton, Pa. 19341 USA. The PAG 107 is available under product name OPPI from UCB Chemicals Corp., 2000 Lake Park Drive, Smyrna (Atlanta), Ga. 30080 USA. The above-discussed exemplary photosensitive starting media are described in the incorporated '017 application.

Referring again to FIG. 8, stamp method 40 includes exposing film 62 of photosensitive medium to one or more interference patterns that are formed by multiple light beams (step 42). The light exposure causes dye molecules to initiate photo-reaction sequences in which initiator complex molecules produce reaction products. Conditions of the light exposure ensure that the reaction products do not significantly diffuse. For this reason, the spatial concentration pattern of the produced reaction products tracks the time-integrated light intensity pattern produced during the light exposure. Also, conditions of the light exposure ensure that significant cross-linking of oligomers does not occur so that refractive index changes do not interfere with progress of the light exposure. Under such exposure conditions and for suitable exposure geometries, the exposure step produces a spatial concentration pattern of photo-reaction products having an internal 2D lattice symmetry, i.e., a symmetry of a micro-lens array.

Figure 15:
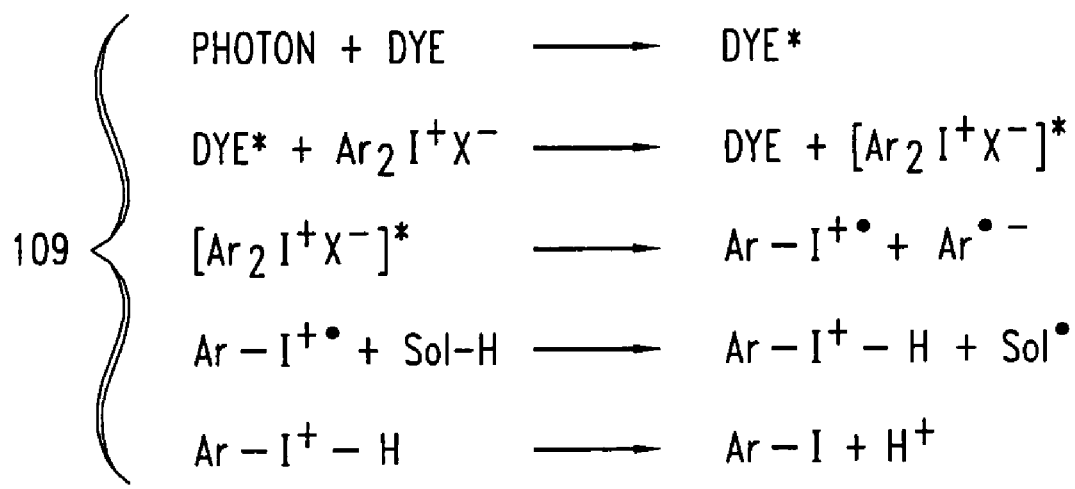
FIG. 15 shows a photo-reaction sequence that occurs in an exemplary photosensitive starting media for the method of FIG. 8.

With respect to the photo-reactions, 514 nm light stimulates photo-reaction sequence 109 of FIG. 15 in a starting media that includes visible dye molecules 102 and PAG molecules 106. In FIG. 15, DYE represents a dye molecule 102, $Ar_2I^+X^-$ represents a PAG molecule 106, Ar—I$^{+\bullet}$ and Ar$^{-\bullet}$ represent aromatic free-radicals, Sol-H represents a non-nucleophilic solvent molecule, Sol• represents a free radical formed from said solvent molecule, and asterisks indicate excited molecules. The photo-reaction sequence 109 produces acid, i.e., free hydronium ions, H$^+$. During the exposure, the hydronium ions do not cause significant cross-linking, e.g. of epoxide oligomers 110, because the medium is kept at a temperature below its glass transition temperature of the medium.

Figure 16A:
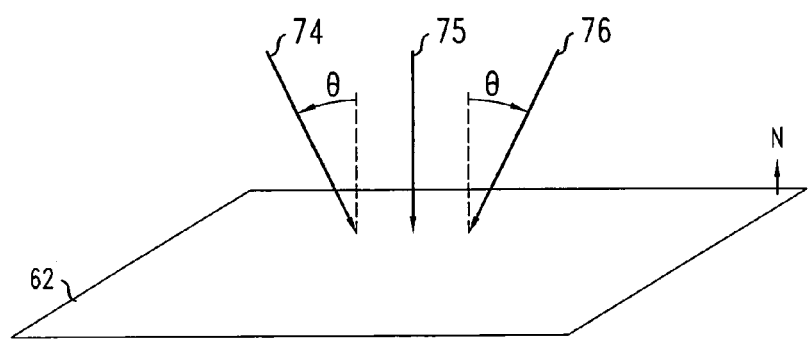
FIG. 16A illustrates a configuration for performing a single light exposure of the photosensitive starting media in the method of FIG. 8.
Figure 16B:
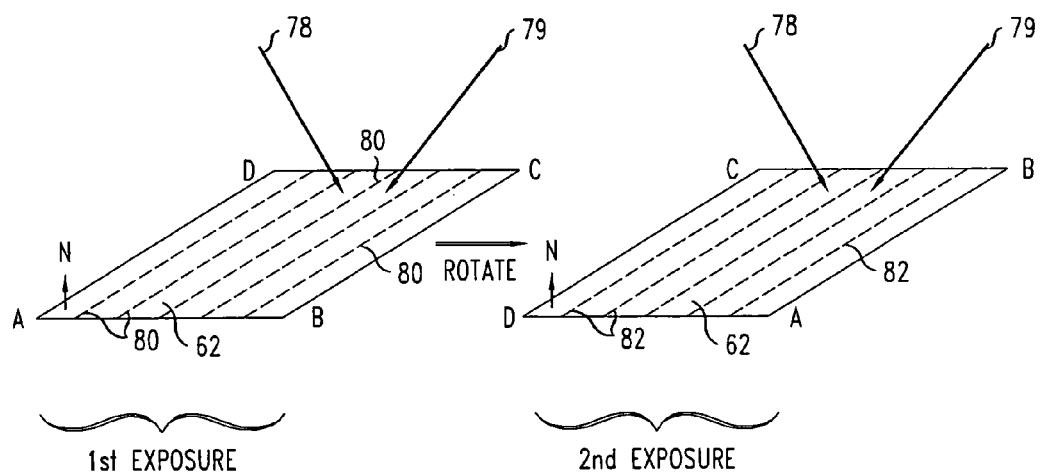
FIG. 16B illustrates configurations for performing a double light exposure of the photosensitive starting media in the method of FIG. 8.

With respect to the exposure geometry, the light exposure uses either three or two interfering light beams. The three-beam geometry involves a single exposure with three mutually coherent laser light beams and produces a pattern with a regular 2D hexagonal lattice symmetry. The light rays of the three beams have coplanar incidence directions 74–76 as shown in FIG. 16A. One beam is incident along the direction of the normal vector, N, to film 62. The other two beams 74, 76 are tilted at equal angles θ with respect to N. The two-beam geometry involves multiple light exposures with two mutually coherent light beams and produces multiple patterns with 1-dimensional (1D) lattice symmetries. An exemplary two-beam geometry uses a double exposure. In each exposure, interfering light rays have coplanar incidence directions 78–79 as shown in FIG. 16B. The exemplary two-beam geometry includes exposing the film 62 with two the two interfering light beams, rotating the film by 90° about the film's normal vector, N, and then, re-exposing the film 62 with the same two interfering light beams. The two exposure produce orthogonal intensity patterns with non-trivial internal 1D periodicities as illustrated by dotted maximum intensity lines 80 and 82. For that reason, the double exposure generates a time-integrated intensity having an internal 2D cubic lattice symmetry. Other embodiments of the two-beam geometry rotate the film 62 by different angles between exposures, 60°, and/or use more than two exposures.

In the various exposure geometries, the internal symmetry and feature-sizes of the exposure pattern determine the internal symmetry and dimensions of the final micro-lens array. Thus, the exemplary three-beam and two-beam geometries produce micro-lens arrays with internal 2D hexagonal and 2D cubic lattice symmetries, respectively. Furthermore, the interfering light patterns have periodicities that are of the order of $\lambda/(2 \sin [\Phi])$ where $\lambda$ is the light wavelength and $\Phi$ is the relative tilt angle between the various beams. For example, $\Phi=\theta$ for the three-beam geometry. Thus, small relative tilt angles, $\Phi$, advantageously produce arrays in which spacings between adjacent lenses are greater than the wavelength of the light used in the exposure.

Figure 11B:

Referring again to FIG. 8, stamp method 40 includes baking the exposed film 62 of photosensitive starting medium and then, washing the baked film 62 to produce a cross-linked master surface pattern 64 as shown in FIG. 11B (step 43). The bake causes a cross-linking of oligomers that partially cures the film 62. Cross-linking occurs, because the temperature of the bake is above the film's glass transition temperature. Above the glass transition temperature, the film 62 is in a rubber-like phase rather than in the low temperature glass-like phase. In the rubber-like phase, oligomers are able to perform movements that are needed to align functional groups during cross-linking reactions. During the bake, the cross-linking reactions proceed in portions of the film that received above-threshold concentrations of photo-reaction products so that the final concentration pattern of cross-links tracks the previous concentration pattern of such photo-reaction products. The washing step removes uncross-linked oligomers, dye molecules, and initiator complexes to leave only the cross-linked portion of the film 62, i.e., the master surface pattern 64. The master surface pattern 64 has a surface relief that includes a pattern of convex bulges or concave depressions. The pattern of convex bulges or concave depressions tracks the earlier produced pattern of photo-reaction products and corresponds in shape to the final 2D micro-lens array.

Figure 17:
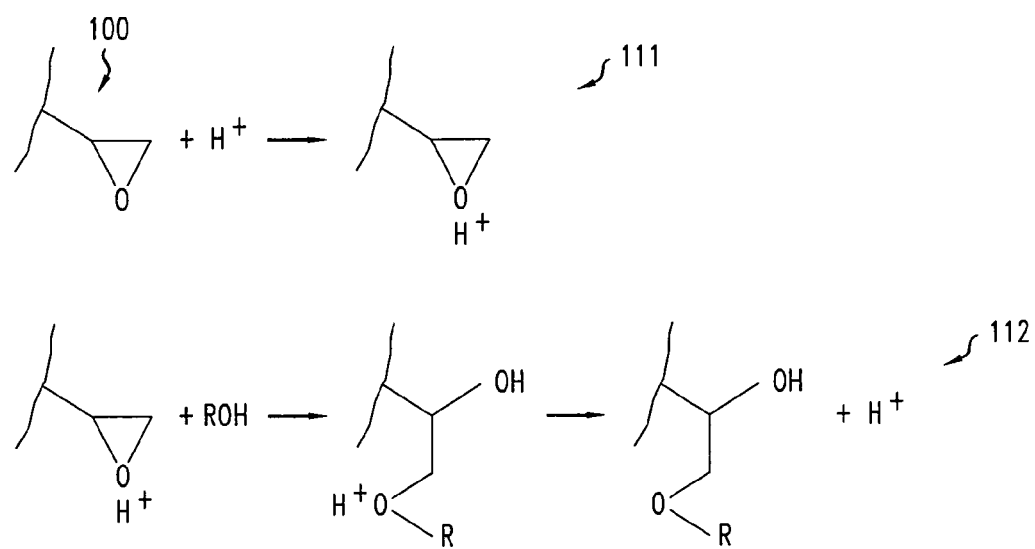
FIG. 17 illustrates cross-linking reactions that occur when exposed starting medium that includes epoxide oligomers and PAG molecules is baked.

With respect to cross-linking, FIG. 17 shows the cross-linking reactions 111–112 that proceed among epoxide oligomers 100 in the presence of acid, e.g., acid produced by PAG molecules 106, 107. In the first reaction 111, a photo-produced $H^+$-ion attacks an epoxide ring of an oligomer 100 to protonate the epoxide ring. In the second reaction 112, the protonated epoxide is attacked by a hydroxide moiety of a ROH, e.g., trace alcohol, water, or a previously cross-linked molecule. This second reaction reproduces a complex with a hydroxide moiety and regenerates a free $H^+$-ion, i.e., a catalyst. The reproduced hydroxide moiety can react with another protonated epoxy ring to form more cross-links to other oligomer. The reaction 112, proceeds above the glass transition of the medium where rotational motions are able to align functional groups as needed for the reaction 112 to proceed.

Figure 11C:
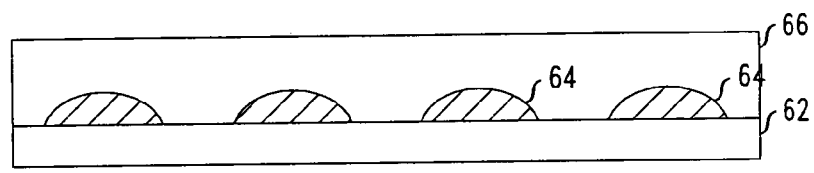
Figure 11D:

Referring again to FIG. 8, stamp method 40 includes coating master surface pattern 64 with a layer 66 of liquid precursor for an elastomer as shown in FIG. 11C and then curing the layer 66 (step 44). The curing involves exposing the liquid precursor to heat or ultraviolet light to cause cross-linking therein. The cured layer 66 is pealed from the master 64 to produce a flexible elastomeric replica stamp 67 as shown in FIG. 11D. The replica stamp 67 has a surface-relief pattern that is a negative copy of the surface-relief of the master surface pattern 64.

Figure 18A:
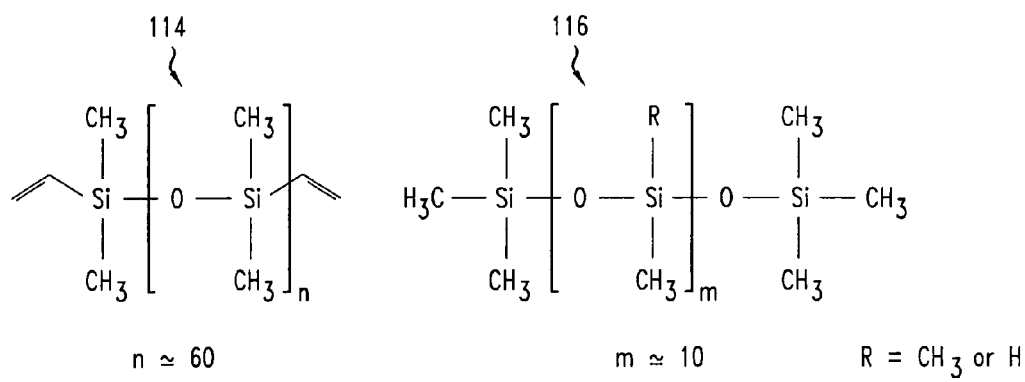
FIG. 18A illustrates exemplary oligomers and cross-linker molecules for forming polydimethylsiloxane (PDMS)
Figure 18B:
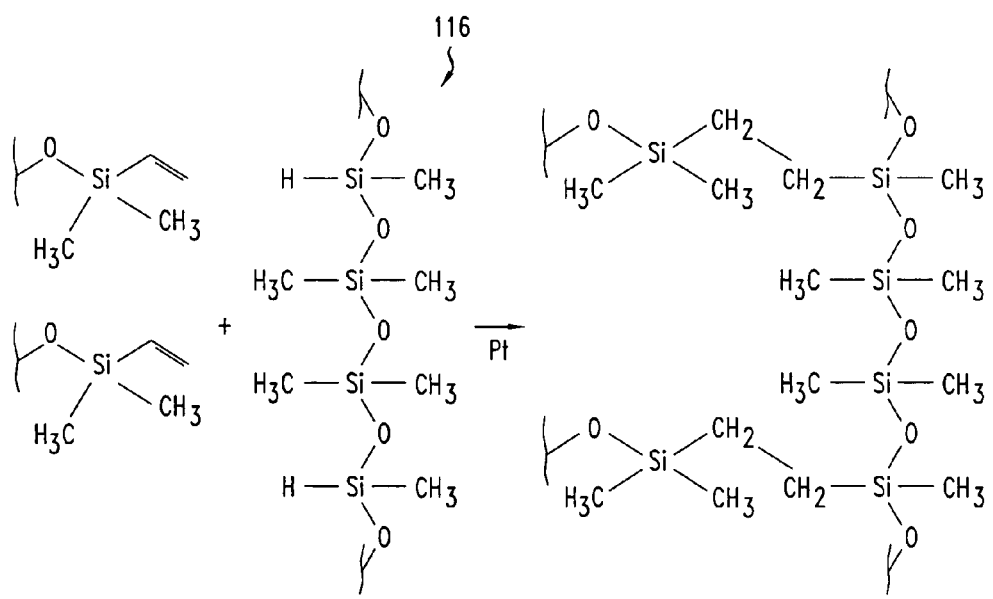
FIG. 18B illustrates a cross-linking reaction for forming PDMS from a mixture of the molecules of FIG. 17A.

In step 44, one suitable elastomer is a polydimethylsiloxane (PDMS). FIG. 18A shows oligomers 114 and cross-linker molecules 116 of an exemplary liquid precursor for a PDMS. The cross-linker molecules 116 have, at least, 3 R-groups, which are hydrogen atoms. FIG. 17B shows the cross-linking reaction, which is known as hydrosilation. Hydrosilation occurs in the presence of a platinum catalyst.

Kits for making PDMSs are available from the Dow Corning Company, P.O. Box 994, MIDLAND Mich. 48686-0994 USA, under the product name SYLGARD® 184 silicone elastomer. To make layer 66 of FIG. 11C, the kit's base and curing liquid components are blended to form a homogeneous mixture in which the base and curing components have a volume ratio of 6:1 to 20:1 and preferably of about 10:1. To form the layer 66, the homogeneous mixture is coated onto a planar substrate. To produce replica stamp 67 of FIG. 11D, the master surface pattern 64 is pressed into the layer 66, which is then heat cured at about 60° C. for about 3 hours. The heat curing produces a flexible, hydrophobic PDMS layer that easily peals off hydrophilic surfaces without becoming damaged.

Figure 11E:
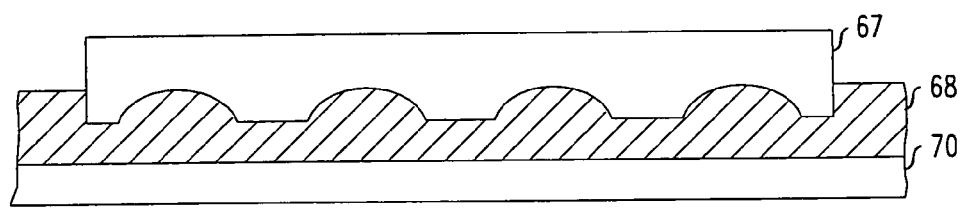

Referring again to FIG. 8, stamp method 40 includes pressing the patterned surface of replica stamp 67 into a layer 68 of liquid hydrogel precursor as shown in FIG. 11E (step 45). The layer 68 of liquid precursor coats a rigid planar substrate 70. The liquid precursor is a homogeneous solution of solvent, hydrogel monomers or oligomers, e.g., monomers of FIG. 2, cross-linker molecules, and ultraviolet-sensitive polymerization initiator molecules. An exemplary liquid precursor includes the following relative weights composition: 0.625 g water, 2.5 g of a mixture of 2-hydroxyethyl methacrylate (HEMA) and acrylic acid (AA) monomers, 25 mg of diethylene glycol dimethacrylate (DEGDMA) cross-linker molecules, and 75 mg of a ultraviolet-sensitive polymerization initiator known as Irgacure 651. The HEMA, AA, and DEGDMA monomers are available from Aldrich, P.O. Box 2060, Milwaukee, Wis. 53201, USA. The mixture of AA and HEMA includes the AA and HEMA monomers in relative molar percentages in the range of about 0.02:1 to about 0.05:1. Irgacure 651 is available from Ciba Specialty Chemicals, 540 White Plains Road, P.O. Box 2005, Tarrytown, N.Y. 10591-9005 USA.

In response to illumination with UV light, an Irgacure 651 molecule generates radicals that initiate polymerization of the HEMA and AA monomers and also causes cross-linking of the HEMA and AA monomers by the DEGDMA monomers. Other ultraviolet-sensitive radical generators can also replace the Irgacure 651, For example, the Irgacure 184 radical generator, which is also available from the Ciba Specialty Chemicals, is also suitable for the liquid precursor to hydrogel.

In various other exemplary liquid precursors for a hydrogel, the above-described components can be present in the following relative molar concentrations: DEGDMA to HEMA in the range of about 0.001:1 to about 0.05:1, AA to HEMA in the range of about 0.02:1 to about 0.05:1, and Irgacure 651 to HEMA in the range of about 0.005:1 to about 0.05:1. Varying these relative concentrations enables one to vary the amount of cross-linking in the final hydrogel and thereby to vary the sensitivity of the hydrogel to changes in environmental conditions.

The stamp method 40 also includes curing the layer 68 to form a hydrogel without removing replica stamp 67 from layer 68 (step 46). Typically, the curing step involves irradiation of the layer 68 with ultraviolet light. For the above exemplary hydrogel precursor, an appropriate curing step uses radiation with a wavelength in the range of 300 nm to 400 nm and preferably a wavelength of about 365 nm.

Figure 11F:
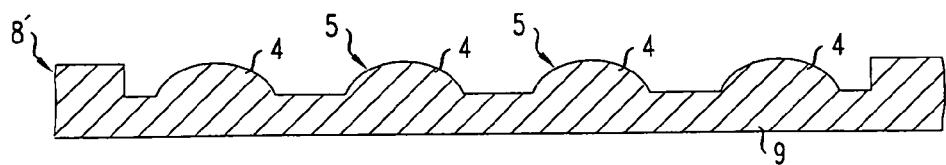
FIG. 11F shows a hydrogel micro-lens array fabricated from the intermediate structure of FIG. 11E.

Referring again to FIG. 8, stamp method 40 includes pealing the elastomeric replica stamp 67 off cured layer 68 to produce a hydrogel micro-lens array 8' as shown in FIG. 11F (step 47). A PDMS replica stamp 67 has hydrophobic surfaces that easily peal from the hydrophilic surface of a hydrogel. Elastomeric stamps 67 can be separated from the cured layer 68 without damaging the patterned surface of either the replica stamp 67 or the cured layer 68.

Figure 9:
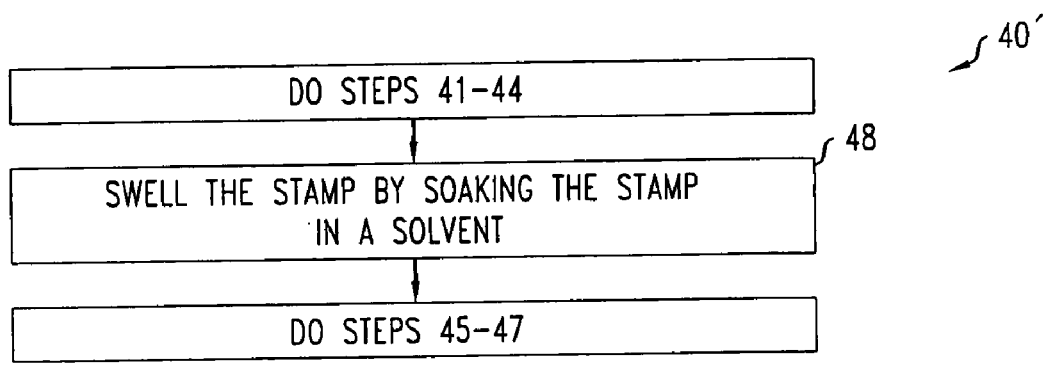
FIG. 9 is a flow chart for an alternate stamp method of fabricating a hydrogel micro-lens array that has an internal 2D lattice symmetry.

FIG. 9 illustrates an alternate stamp method 40' for fabricating a micro-lens array with an internal 2D lattice symmetry. The method 40' includes producing elastomeric replica stamp 67 by performing steps 41–44 as already described with respect to method 40. The method 40' also includes soaking the replica stamp 67 in an organic solvent that swells material of the replica stamp 67 (step 48). For PDMS, exemplary solvents that can cause swelling include: hexane, toluene, cyclohexane, and methyl cyclohexane. The swelling uniformly increases the linear dimensions of the patterned surface-relief of the replica stamp 67. The stamp method 40' also includes performing steps 45–47 with the swollen stamp 67 to make a hydrogel micro-lens array in which internal lattice dimensions are larger than those produced lithographically in master surface pattern 64.

Figure 10:
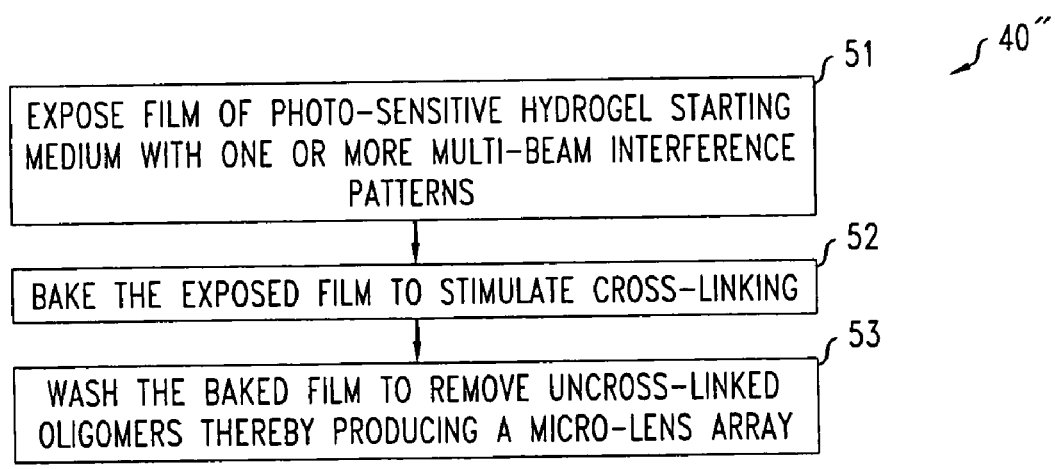
FIG. 10 is a flow chart for a direct method of fabricating a micro-lens array that has an internal 2D lattice symmetry in a photosensitive liquid precursor for hydrogel.

Referring to FIG. 10, method 40" forms a micro-lens array directly in a film of photosensitive hydrogel starting medium. The photosensitive hydrogel starting medium is a homogeneous mixture of a special photoresist. The special photoresist includes hydrogel polymer molecules, dye molecules, initiator complexes, solvent, and optionally cross-linker molecules. An exemplary composition for the photoresist includes copolymer and cross-linker molecules 122, 124 of FIG. 19; visible dye molecules 102, 103, or 104 of FIGS. 13A–13C; PAG molecules 106 or 107 of FIGS. 14A–14B; and tetrahydrofuran as a solvent. The copolymer 122 is poly(2-hydroxyethyl methacrylate-co-methyl methacrylate) (PHEMA-co-PMMA). PHEMA-co-PMMA is characterized by copolymer integers "n" and "m" that are in the range of [50, 500] and a molecular weight of about 10,000–100,000 atomic mass units. The cross-linker molecule 124 is tetramethoxymethyl glycoluril (TMMG). TMMG is available under product name POWDERLINK 1174 from Cytec Industries Inc., 5 Garret Mountain Plaza, West Paterson, N.J. 07424-3360 USA. In the exemplary composition, the various components have the following relative wt %'s: TMMG to PHEMA-co-PMMA in the range of about 0.01:1 to 0.05:1, dye HNu 535 to PHEMA-co-PMMA in the range of about 0.002:1 to 0.02:1, and SarCat® SR1012 to PHEMA-co-PMMA in the range of about 0.005:1 to about 0.03:1. The composition includes enough solvent to dissolve the dye molecules. A composition for the photoresist includes the above components in the following relative amounts: about 2.5 g of PHEMA-co-PMMA, about 50 mg of TMMG, about 25 mg of the dye HNu 535, about 62.5 mg of SR1012, and about 10 g of tetrahydrofuran.

Figure 20:
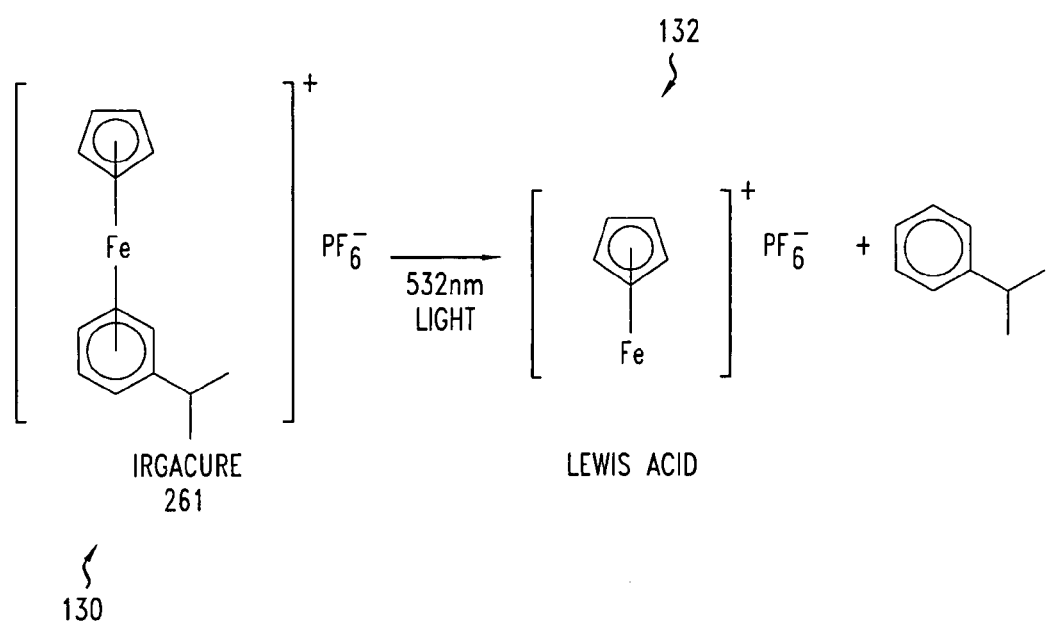
FIG. 20 shows photo-reactions of photosensitive PAG molecules able to replace dye and PAG molecules in photosensitive starting media of FIGS. 8–10.

In other exemplary photosensitive hydrogel starting media, photosensitive PAG molecules replace the mixture of PAG and dye molecules. One photosensitive PAG molecule is sold under the product name Irgacure 261 by the Ciba Specialty Chemical Inc. As FIG. 20 shows, molecules 130 of Irgacure 261 undergo photo-disassociation when subjected to light with a wavelength of 532 nm. The photo-disassociation produces molecules 132, which are Lewis acids. To replace the dye HNu 535 and the initiator complex SarCat® SR1012 in the above-described photoresist, Irgacure 261 is added to produce in the photoresist a relative wt % of Irgacure 261 to PHEMA-co-PMMA in the range of about 0.005:1 to 0.02:1. Irgacure 261 has the advantage of having a higher solubility than the dye HNu 535. For that reason, the photoresist may include organic solvents such as cyclopentanone, propylene glycol methyl ethyl ether. With these solvents, the starting media may have a high concentration of hydrogel polymers, e.g., a relative weight of polymer to solvent is in the range of about 2:8 to 3:7.

Some photosensitive hydrogel starting media include small amounts of neutralizer molecules. The concentration of neutralizer molecules is fixed to eliminate spatially constant densities of photo-reaction products that are produced during the exposure step. For starting media that use PAGs as initiator complexes, exemplary neutralizer molecules are bases such as triethyl amine. The use of neutralizer molecules to eliminate spatial constant backgrounds of photo-reaction products is also described in the incorporated '017 application.

Referring again to FIG. 10, method 40" includes light exposing a film of photosensitive hydrogel starting medium to one or more light interference patterns (step 51). The light exposure step involves either a single exposure with three interfering mutually coherent light beams or a double exposure with two interfering mutually coherent light beams as described with respect to FIGS. 16A and 16B, respectively. The light exposure excites dye molecules, which in turn excite initiator complexes. The excited initiator complex molecules undergo reactions to produce photo-reaction products whose spatial concentration pattern tracks the pattern of the time-integrated light intensity. The pattern of reaction products corresponds to that of a 2D micro-lens array. In the above-described exemplary photosensitive hydrogel starting medium, the exposure stimulates photo-reaction sequence 109 of FIG. 15 to produce a distribution of free hydronium ions, $H^+$. During the exposure, the hydrogel starting medium is kept at a temperature that is below the medium's glass transition temperature to impede diffusion of the reaction products and cross-linking of the hydrogel oligomers.

Figure 19:
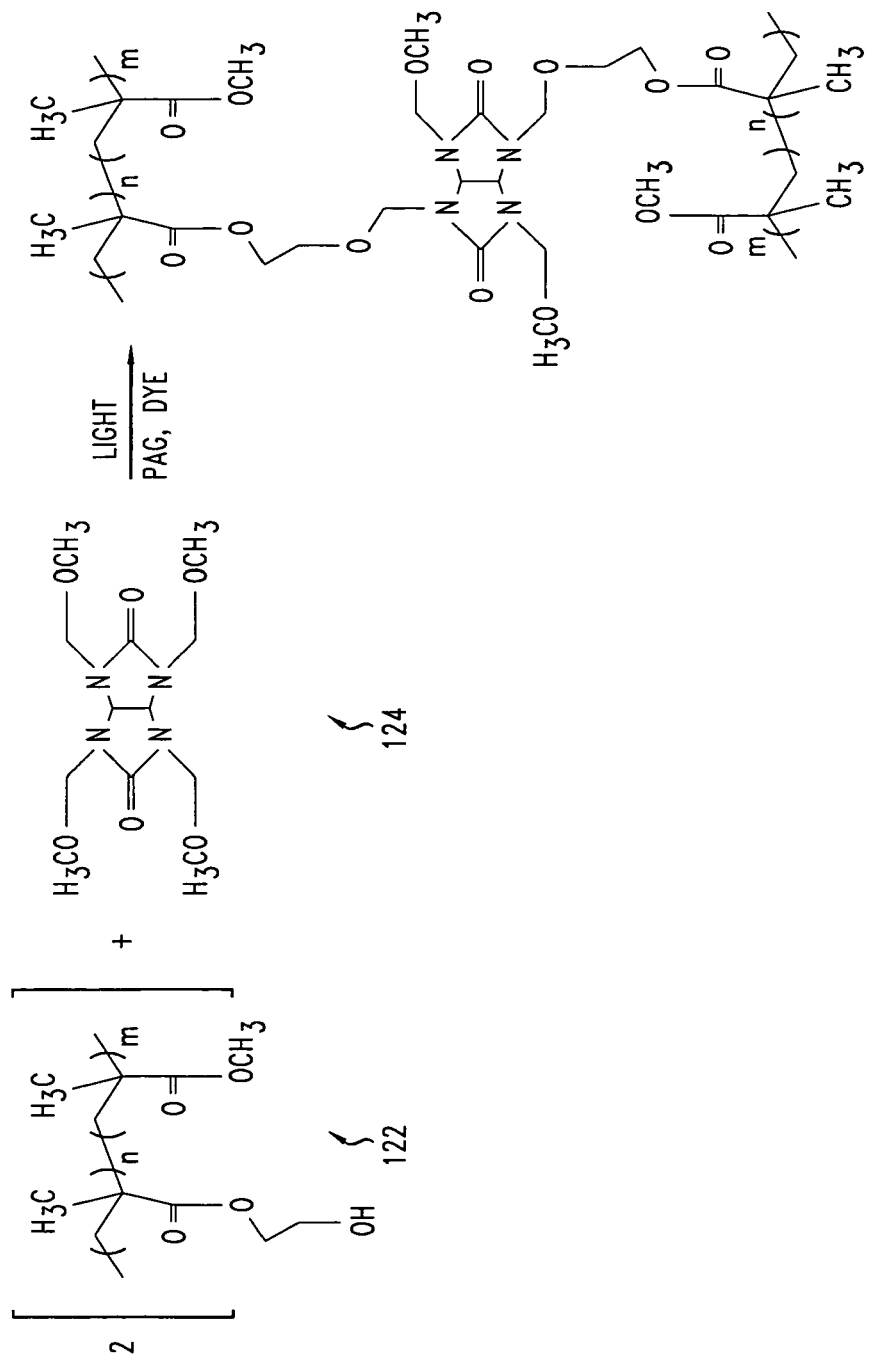
FIG. 19 illustrates a cross-linking reaction in an exemplary photosensitive hydrogel starting medium for the method of FIG. 10.

Referring again to FIG. 10, method 40" includes baking the exposed film of photosensitive hydrogel starting medium to stimulate cross-linking reactions among hydrogel oligomers therein (step 52). One reaction 126 that covalently cross-links exemplary hydrogel oligomers 122 via exemplary cross-linker molecules 124 is shown in FIG. 19. The cross-linking reaction produces a spatial concentration pattern of cross-links that tracks the concentration pattern of photo-reaction products, e.g., acid, produced during the light exposure step.

Method 40" also includes washing the baked film with a non-polar solvent to remove uncross-linked hydrogel oligomers, dye molecules, initiator complexes, and unreacted cross-linker molecules. An exemplary solvent for the wash is the same solvent used in the hydrogel starting medium, e.g., tetrahydrofuran. The wash step leaves an insoluble cross-linked hydrogel structure. For suitable beam geometries during exposure step 51, the cross-linked hydrogel structure will have a surface-relief pattern that tracks the earlier produced spatial pattern of photo-reaction products.

From the disclosure, drawings, and claims, other embodiments of the invention will be apparent to those skilled in the art.

What is claimed is:

1. An apparatus, comprising:
   a planar substrate; and
   an array of substantially transparent spherical micro-lenses on the substrate, the micro-lenses forming a pattern, the pattern having an internal two-dimensional lattice symmetry on the planar substrate; and
   wherein each micro-lens comprises one of a convex bulge in a surface of the planar substrate and concave depression in a surface of the planar substrate; and
   wherein the micro-lenses and substrate comprise hydrogel that significantly swells and contracts in a manner responsive to an environmental condition.

2. The apparatus of claim 1, wherein each micro-lens has one spherical surface and one flat surface, the flat surface being on an opposite side of the substrate as the spherical surface.

3. The apparatus of claim 1, further comprising:
   a second planar substrate that is substantially transparent; and
   wherein the array is constrained to rest on the second substrate in a manner than enables the array to swell and contract.

4. The apparatus of claim 1, wherein a center-to-center spacing between the micro-lenses of the array is less than about 500 microns.

5. The apparatus of claim 1, further comprising:
   a spatially segmented light intensity detector positioned to intercept light spots produced by the micro-lenses; and
   a data processor configured to receive intensity and position data from the light intensity detector.

* * * * *